United States Patent Office 3,530,292
Patented Sept. 22, 1970

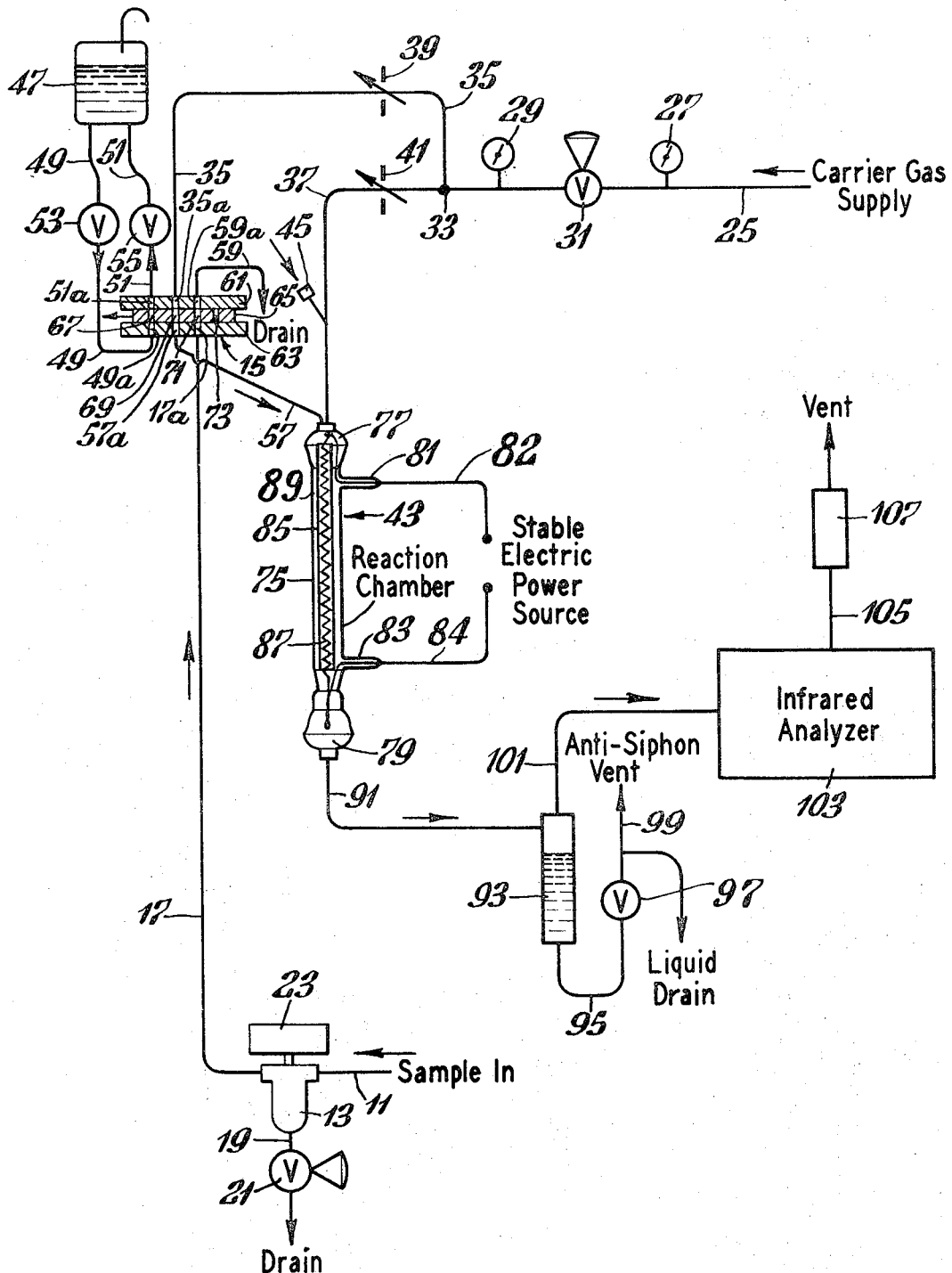

3,530,292
APPARATUS AND METHOD FOR DETERMINATION AND MEASUREMENT OF CARBON IN AQUEOUS SOLUTIONS
Herbert N. Hill, Jr., South Charleston, W. Va., assignor to Union Carbide Corporation, a corporation of New York
Filed Apr. 26, 1967, Ser. No. 633,807
Int. Cl. G01n *21/26, 21/34*
U.S. Cl. 250—43.5                                      10 Claims

ABSTRACT OF THE DISCLOSURE

An apparatus and method for determining the presence and amount of relatively small concentrations of organic and inorganic carbon-bearing constituents in aqueous solutions. A predetermined quantity of aqueous solution sample to be analyzed for carbon present therein is injected into an inert nonoxygen containing carrier gas stream and transported into a reaction chamber wherein the water is vaporized and the carbon-bearing constituents are converted to carbon dioxide at a temperature of from about 700° C. to about 900° C. The vaporized water, carbon dioxide and other reaction products from the reaction chamber are carried through a conduit wherein some water condenses, through a gas-liquid separator wherein the water is removed and wherefrom remaining gases and vapors are transported to an analyzer selectively sensitized to measure carbon dioxide and which reads out or produces indicia in terms of total carbon present in the original sample.

---

The invention described and claimed in this application represents an improvement and a considered advance in the art over the method for organic carbon determination and measurement of U.S. Pat. No. 3,322,504 to Capuano.

The present invention relates to a novel analytical method and apparatus for the qualitative and quantitative determination of organic and inorganic carbon-bearing constituents present in aqueous solutions such as river water and the like. The present invention finds particularly advantageous applications in stream pollution analyses where pollution is brought about by industrial waste water outfalls, industrial process stream leakages, sewage plant outfalls and accidental spillages and more particularly still where hazardous locations militate against using oxygen carrier streams in the analytical systems employed.

Industry, particularly the chemical manufacturing industry, has long been plagued with the problems attending effective stream pollution control of rivers and streams adjacent plant sites. The most rigorous precautions in plant design in operating techniques have not fully obviated the problems which arise when pollution control arrangements operate at less than full effectiveness or when process fluids inadvertently leak or spill into plant water systems ultimately discharged into nearby water sources. One of the most effective control techniques for stream pollution work has been found to be the continual monitoring of plant water outfalls for the detection and measurement of pollution-causing industrial wastes, such as alcohols, ketones, aldehydes, and the like. Municipalities and other centers of human congregation are also known to contribute to water pollution through less than completely effective sewage disposal methods.

Current techniques for the determination and measurement of carbon in aqueous solutions involve pyrolyzing a sample of interest in an oxygen atmosphere and then measuring, by one means or another, the carbon dioxide in the combustion products. In the aforenoted application Ser. No. 316,887, a continuous analytical method is taught wherein the combustion products from an oxygen and sample fed pyrolyzer are reacted with an electrolytic solution which is then differentially conductometrically analyzed, the readout being proportional to carbon concentration in the sample. U.S. Pat. 3,296,435 similarly teaches the muffle furnace pyrolysis of an aqueous sample in the presence of oxygen with the ultimate detection and measurement of carbon dioxide performed with an infrared analyzer.

In general, the present invention comprehends periodically introducing a predetermined quantity of aqueous sample to be analyzed for total carbon content into a continuously flowing carrier stream of inert non-oxygen containing gas, directing the sample and stream into a reaction chamber containing a catalytically active element at a temperature of from about 700° C. to about 900° C. sufficient to vaporize the water and to convert carbon in the carbon-bearing constituents in the sample into carbon dioxide, passing the vaporized water, carbon dioxide and other products of the reaction through conduit means wherein some water condenses out, a gas-liquid separator wherein the remaining water is condensed and water is removed and then passing the remaining gases and vapors into an analyzer sensitized to be selectively responsive to carbon dioxide and which produces readout indicia proportional to and representative of the concentration of carbon in the sample introduced.

It is thus an object of this invention to provide for the accurate detection and measurement of total carbon in concentrations of carbon-bearing constituents occurring in aqueous bodies such as lakes, streams, river water, plant outfall water and the like.

It is a further and important object of the invention to provide an analytical technique for carbon detection operable with non-oxygen containing inert gases as carrier streams and reaction media making for increased safety, particularly in hazardous location applications.

With the foregoing and other objects in view, which will become more apparent hereinafter, the invention will now be described with greater particularity and with reference to the drawing which shows in a single figure a schematic flow diagram illustrative of apparatus to perform the method according to the invention.

With reference to the drawing, a sample inlet conduit 11 connects to a filter 13 which in turn connects to a flow selector control valve 15 through a conduit 17. Filter 13 is provided with a drain conduit 19 in which a drain valve 21 is arranged to facilitate periodic filter cleaning. The purpose of filter 13 is to remove agglomerate and particalized matter from the sampled stream and thus insure against fouling the analyzer apparatus. From time to time as conditions dictate, the filter 13 is mechanically cleaned by means of a filter cleaner actuator 23 while the drain valve 21 is opened. The sample stream washes the agglomerates, particles, etc. cleaned from the filter mechanism out through drain conduit 19. Pneumatic or other conventional means are employed to operate the drain valve and the filter cleaner actuator.

A carrier gas supply conduit 25 furnishes carrier gas through an array of gauges 27, 29 and a pressure regulator 31 to a bifurcation point 33 from which two carrier gas conduits 35, 37 extend. Adjustable restrictors 39, 41 may be provided respectively in conduits 35, 37 to control flow of the carrier gas. Carrier gas conduit 35 connects to the flow selector control valve 15 while carrier gas conduit 37 connects from bifurcation point 33 to the inlet of a reaction chamber 43 and is provided with a syringe sample injection port 45. Persons familiar with analytical apparatus will understand this arrangement as providing for alternative routes for sample injection into the carrier gas stream, that is to say, one route automatically through the flow selector control valve 15 and the other manually through the syringe sample injection port 45.

Reservoir 47, filled with a suitable purging liquid, preferably distilled water, is closed-loop connected to flow selector control valve 15 through a supply conduit 49 and a return conduit 51, each of which may be provided with a convenience valve 53, 55.

Completing connections at the flow selector control valve 15 are the conduit 57 extending therefrom to the inlet of the reaction chamber 43 and the drain conduit 59. The essential elements and features of the flow selector control valve 15 for the purposes of describing this invention are best illustrated with reference to a sliding plate valve embodiment, although it is to be understood that the invention is in no way limited to such valve configuration, being equally operable with rotary valves, linear piston valves and the like and even with manual sample injection through the sample injection port 45 for instance. Between an upper valve body portion 61 and a lower valve body portion 63, a sliding plate 65 is arranged and adapted to move alternately between two positions. Sliding plate 65 is provided with four passages 67, 69, 71, 73 extending completely therethrough. In upper valve body portion 61 the passages 51a, 35a and 59a connect the conduits 51, and 35 and 59 respectively to passages 67, 69, and 71. In lower valve body portion 63 the passages 49a, 57a and 17a connect the conduits 53, 57 and 17 respectively to passages 67, 69 and 71. Passage 73 remains unconnected to any external conduits with the sliding plate 65 in the position shown. As will be explained in greater detail hereinafter, the sliding plate 65 may be moved selectively to the left of the position shown in which instance the registering positions of the passages will be 51a, 69, 49a; 35a, 71, 57a; and 59a, 73, 17a; with passage 67 unconnected to any external conduits.

The reaction chamber 43 comprises an outer shell or body 75 of high silica glass provided with ball type conduit connection joints 77, 79 and electrical conductor sleeves 81, 83 at the respective ends therof. A liner tube 85 of refractory material such as mullite or the like is arranged in body 75 of the reaction chamber so as to define an annular space between the body inner wall surface and the liner tube outer wall surface. A catalytic element such as a coil 87 of electrically conductive material is disposed inside the liner tube 85 and is provided with electrical leads 82, 84 which extend respectively through sleeves 81, 83 to electrical connection points exterior the reaction chamber. The annular space between the liner tube and the reaction chamber body may be filled with insulative material 89 such as ground quartz. The lower space in the reaction chamber liner tube surrounding some of the turns of coil 87 may advantageously be filled with a high temperature resistant cotton-like filter material which offers insignificant resistance to gas and vapor flow but prevents liquid sample from flowing out of the reaction chamber before it is completely vaporized and catalytically converted.

Conduit 91 extends from the outlet end of reaction chamber 43 to a gas-liquid separator 93 provided with an anti-siphon water removal system comprising a drain conduit 95 which includes a flow damping valve 97 and an antisiphon vent conduit 99. Conduit 101 extends from the gas outlet of separator 93 to an analyzer 103 which may be preferably an infrared analyzer. The analyzer 103 discharges the measured sample through a vent conduit 105 which may be provided with a rotameter 107.

With the sliding plate 65 of flow selector control valve 15 in the position shown a continuous stream of aqueous sample flows in through conduit 11, filter 13, conduit 17 passages 17a, 71, 59a and conduit 59 to drain. Carrier gas flows through conduit 25 regulator 31, conduit 35, restrictor 39, passages 35a, 69, 57a conduit 57, reaction chamber 43, conduit 91, gas-liquid separator 93, conduit 101, analyzer 103, and out through vent conduit 105 and rotameter 107. Distilled water from reservoir 47 fills the closed loop consisting of conduit 49, passages 49a, 67, 51a, and conduit 51.

To perform an analysis, the flow selector control valve 15 is actuated to move the sliding plate to the left from the position shown in the drawing so that the passage alignment will be, from left to right, 51a, 69, 49a; 35a, 71, 57a; and 59a, 73, 17a. Thus a quantity of sample equal to the volume of the passage 71 is introduced into the carrier gas stream and swept through conduit 57 into the reaction chamber wherein the catalytically active coil 87 vaporizes the water of the sample and converts carbon in the carbon-bearing constituents in the sample into carbon dioxide, the necessary oxygen deriving from the water of the aqueous sample. From the outlet end of the reaction chamber the carrier gas stream containing the sample now converted to water and perhaps other vapors, carbon dioxide and whatever other products of the reaction proceeds through conduit 91 wherein some water condenses and into the gas-liquid separator 93 wherein the remaining water is condensed out and all water separated from the other vaporous and gaseous constituents and disposed of a drain through conduit 95 and valve 97. Continuing the carrier gas stream containing the carbon dioxide and other gases and vapors enters the analyzer 103 through conduit 101. The analyzer 103, say an infrared analyzer, is selectively set to detect and measure for carbon dioxide and produces readout indicia, for example on a recording chart, which is proportional to and representative of the concentration of total carbon in the sample introduced.

With the sliding plate 65 moved to the left position the distilled water volume in passage 67 is trapped between the upper and lower valve body portions 61, 63 and the volume of carrier gas in passage 69 is introduced into the distilled water system wherein it rises as a bubble from the valve 15 through conduit 51 and goes to the atmosphere through the distilled water surface in reservoir 47. Passage 73 is disposed to replace passage 71 and provides for continuity of flow of the sample stream from inlet to drain thus assuring availability of fresh flowing sample for subsequent analyses.

When the sliding plate 65 is moved to the right again, back to the position shown in the drawings, the distilled water volume in passage 69 is transferred into the carrier gas stream and aids in cleaning the analyzer system; the carrier gas volume in passage 71 is transferred into the sample stream and goes to drain through conduit 59; and a small volume of sample is trapped in passage 73 until the start of the next analysis.

In a specific and preferred embodiment of apparatus for practicing the invention, the reaction chamber 43 is formed from a one foot length of 15 mm. I.D. high silica glass and fitted with a 10⅞″ long x ½″ O.D. x ⅜″ I.D. mullite liner tube. A 5 ft. length of 22-gauge palladium wire is coiled, placed inside the liner tube and electrically connected to suitable lead out conductors. Powdered quartz fills the annular space between the glass body and the liner tube of the reaction chamber and the coil, in operation, is powered at 300 watts from a stable electric power source comprising a solid-state variable power supply transformer and a voltage stabilizer.

A pneumatically actuated sliding plate valve substantially similar to one described hereinabove is provided for flow selector control. Distilled water is used as the purging liquid. A commercially available infrared analyzer selectively sensitized to carbon dioxide is used as analyzer 103 and a commercially available pneumatically actuated filter 13 is used. An instrument air supply regulated at 0–30 p.s.i.g. provides the actuating medium for the filter 13 and valve 15. Stainless steel 1/16″ O.D. tubing is used in the nonsample containing portions of the flow system and corrosion-resistant nickel-chromium alloy 1/16″ O.D. tubing is used in the sample containing portions.

The entire arrangement of apparatus is controlled by a timer comprising an electric motor geared to a set of cams which actuate microswitches which in turn operate solenoid valves in the pneumatic and system flow control lines.

EXAMPLE I

With the aforedescribed apparatus arrangement and an analyzer recorder capable of 0–5 millivolt full scale deflection, nitrogen was connected as the carrier and gas and adjusted to a 75-cubic-centimeter-per-minute flow rate. To calibrate the apparatus, known parts per million concentrations of acetic acid to provide carbon were introduced and yielded the following:

CALIBRATION DATA

| Added (known) carbon concentration (acetic acid) | Chart divisions | Millivolts |
| --- | --- | --- |
| 100 p.p.m. | 99.5 | 5 |
| 75 p.p.m. | 76 | 3.8 |
| 50 p.p.m. | 56 | 2.8 |

To determine reproducibility, five runs were made each with an introduction of 75 p.p.m. acetic acid and the following data obtained:

REPRODUCIBILITY OR STABILITY DATA

| | Total carbon p.p.m. | | |
| --- | --- | --- | --- |
| Run | Added | Found | Difference |
| 1 | 75 | 76 | +1 |
| 2 | 75 | 77 | +2 |
| 3 | 75 | 76.5 | +1.5 |
| 4 | 75 | 76.5 | +1.5 |
| 5 | 75 | 76.5 | +1.5 |

EXAMPLE II

Efficiency in determining carbon content of several different inorganic and organic carbon-containing compounds was investigated. For this investigation nitrogen carrier gas adjusted to a flow rate of 50 cubic centimeters per minute was used, acetic acid was employed as a standard sample and the reaction chamber coil used was made from a 7-foot length of 22-gauge palladium wire and energized at 250 watts. The following results were obtained with 22 different samples.

| | | | Carbon, ml. gm./liter | | |
| --- | --- | --- | --- | --- | --- |
| Sample No. | Compound | Molecular weight | Added | Found | Difference— Chart divisions |
| 1 | Acetic acid | 60.5 | 50 | 52.5 | (1) |
| 2 | Benzene | 78.11 | 50 | 53.5 | +1 |
| 3 | Toluene | 92.13 | 50 | 54.0 | +1.5 |
| 4 | Styrene oxide | 120.15 | 50 | 58.0 | +5.5 |
| 5 | Butyl ether | 130.23 | 50 | 55.0 | +2.5 |
| 6[2] | Sodium acetate | 82.03 | 50 | 54.0 | +1.5 |
| 7 | Ethylene glycol | 281.89 | 50 | 53.0 | +.5 |
| 8 | Diethylene glycol | 106.12 | 50 | 54.0 | +1.5 |
| 9 | Ethanol | 61.08 | 50 | 56.0 | +3.5 |
| 10 | Propionic acid | 74.08 | 50 | 54.0 | +1.5 |
| 11 | Paraldehyde | 132.16 | 50 | 55.0 | +2.5 |
| 12 | Butyraldehyde | 176.17 | 50 | 55.0 | +2.5 |
| 13 | Acetone | 58.08 | 50 | 56.0 | +3.5 |
| 14 | Methyl ethyl ketone (MEK) | 72.11 | 50 | 58.0 | +5.5 |
| 15 | Diethyl ether | 154.11 | 50 | 56.0 | +3.5 |
| 16 | Butyl Cellosolve | 92.57 | 50 | 58.0 | +5.5 |
| 17 | Butylamine | 73.14 | 50 | 52.0 | −.5 |
| 18 | Acetonitrile | 41.05 | 50 | 59.0 | +6.5 |
| 19[2] | Sodium carbonate | 105.99 | 50 | 54.0 | +1.5 |
| 20[2] | Sodium bicarbonate | 84.02 | 50 | 54.0 | +1.5 |
| 21 | Methanol | 32.04 | 50 | 58.0 | +5.5 |
| 22 | Benzoic acid | 122.12 | 50 | 55.0 | +2.5 |

[1] Standard sample—Recorder set at 52.5 chart divisions.
[2] Inorganic.

EXAMPLE III

Runs were made with other inert non-oxygen containing gases. After a stabilizing run using nitrogen as the carrier gas at a flow rate of 75 cubic centimeters per minute and with a reaction chamber coil of 7 feet of 22 gauge palladium wire energized at 250 watts an amount of acetic acid corresponding to 50 p.p.m. of carbon was introduced and produced a readout of 73 chart divisions. The carrier gas was switched to a helium supply, acetic acid to provide 50 p.p.m. of carbon injected into the analyzer and a readout of 74 chart divisions was obtained. The carrier gas was then switched to an argon supply, acetic acid to provide 50 p.p.m. of carbon injected into the analyzer and a readout of 75 chart divisions was obtained.

These experiments proved that oxygen as a carrier gas and a reaction medium is not essential to total carbon analysis according to the present invention.

EXAMPLE IV

In order to test the efficacy of catalytically active coils or elements other than palladium of reaction chamber 43, runs were made using a coil made from a 5-foot length of 22-gauge nichrome and a coil made from a 5-foot length of 22-gauge platinum energized at 300 watts using nitrogen as the carrier gas at a flow rate of 75 cubic centimeters per minute. The following results were obtained using two different samples.

| Coil | Sample | Added, p.p.m. | Found |
| --- | --- | --- | --- |
| Nichrome | Acetic acid | 50 | 55 |
| | Acetone | 50 | 44 |
| Platinum | Acetic acid | 50 | 49 |
| | Acetone | 50 | 48 |

The results obtained indicate substantially the same reproducibility of the test results obtained with the palladium element used in the examples described herein above.

The foregoing description is illustrative only and should not be taken in any limiting sense, it being possible in the light of this disclosure to have numerous alternatives within the spirit and scope of the ignition suggest themselves to persons familiar with the art. Accordingly the invention is defined according to the appended claims.

What is claimed is:

1. Apparatus for the qualitative and quantitative determination of carbon in an aqueous solution comprising, in combination, a carrier gas supply source for providing and maintaining a confined stream of substantially oxygen-free carrier gas from a pressurized source at a constant and predeterminable flow rate; means for introducing aqueous solution samples to be analyzed for carbon content into said stream of carrier gas; reaction chamber means containing an element catalytically active to produce, among other products, carbon dioxide from the water of and the carbon in the aqueous solution; means for the separation and removal of condensate liquids from gaseous products produced in said reaction chamber means; detection means sensitized to be selectively responsive to carbon dioxide and to produce signal indicia proportional to and representative of carbon content of the aqueous sample; and conduit means to provide continuous passage of fluids through the apparatus components.

2. Apparatus according to claim 1 wherein the carrier gas supply source is a source of one gas selected from the group consisting of nitrogen, helium and argon.

3. Apparatus according to claim 1 wherein the carrier gas supply source is a source of nitrogen.

4. Apparatus according to claim 1 wherein the reaction chamber element is a coil of palladium wire heated to a temperature of from about 700° C. to about 900° C.

5. Apparatus according to claim 1 wherein the detection means is an infrared analyzer.

6. A method for the qualitative and quantitative determination of carbon in an aqueous solution comprising the steps of introducing a quantity of aqueous sample to be analyzed for carbon content into a confined stream of substantially oxygen-free carrier gas; directing the stream of carrier gas containing the sample to impinge on a reaction chamber element which is catalytically active to produce, among other products, carbon dioxide from the water of and the carbon in the aqueous solution; separating and removing the liquids from the gaseous products produced at the reaction chamber element; analyzing said gaseous products for carbon dioxide content and in such analysis, producing signal indicia representative of and proportional to the carbon present in the sample.

7. A method according to claim 6 wherein the reaction chamber element is a coil of palladium wire heated to a temperature of from about 700° C. to about 900° C.

8. A method according to claim 6 wherein the aqueous sample to be analyzed is introduced into a carrier gas stream of a gas selected from the group consisting of nitrogen, helium and argon.

9. A method according to claim 6 wherein the aqueous sample to be analyzed is introduced into a carrier gas stream of nitrogen.

10. A method according to claim 6 wherein the analysis of gaseous product and singal producing steps are performed with an infrared analyzer.

References Cited

UNITED STATES PATENTS

| 3,224,837 | 12/1965 | Moyat | 23—230 |
| 3,296,435 | 1/1967 | Teal et al. | 250—43.5 |

WILLIAM F. LINDQUIST, Primary Examiner